(12) United States Patent
Klemmensen

(10) Patent No.: US 11,546,704 B2
(45) Date of Patent: Jan. 3, 2023

(54) PRE-PAIRING OF HEARING AIDS

(71) Applicant: Oticon A/S, Smørum (DK)

(72) Inventor: Bjarne Klemmensen, Smørum (DK)

(73) Assignee: OTICON A/S, Smørum (DK)

( * ) Notice: Subject to any disclaimer, the term of this patent is extended or adjusted under 35 U.S.C. 154(b) by 229 days.

(21) Appl. No.: 16/904,925

(22) Filed: Jun. 18, 2020

(65) Prior Publication Data
US 2020/0404435 A1 Dec. 24, 2020

(30) Foreign Application Priority Data
Jun. 19, 2019 (EP) .................................... 19181207

(51) Int. Cl.
  *H04R 25/00* (2006.01)
  *H04W 4/80* (2018.01)
  *H04W 76/14* (2018.01)

(52) U.S. Cl.
  CPC ......... *H04R 25/554* (2013.01); *H04R 25/552* (2013.01); *H04W 4/80* (2018.02); *H04W 76/14* (2018.02); *H04R 2225/55* (2013.01)

(58) Field of Classification Search
  None
  See application file for complete search history.

(56) References Cited

U.S. PATENT DOCUMENTS

| | | | | |
|---|---|---|---|---|
| 2011/0188684 A1* | 8/2011 | Spieler | .................. | H04R 25/70 381/315 |
| 2013/0315424 A1* | 11/2013 | Eaton | .................... | H04R 25/70 381/314 |
| 2014/0331218 A1* | 11/2014 | Kryzer | ..................... | G06F 8/65 717/170 |
| 2015/0281863 A1* | 10/2015 | Westergaard | .......... | H04R 25/70 381/60 |
| 2017/0286918 A1 | 10/2017 | Westermann et al. | | |
| 2019/0268707 A1* | 8/2019 | Solum | ................. | A61B 5/4815 |

FOREIGN PATENT DOCUMENTS

| | | | |
|---|---|---|---|
| EP | 2 605 492 A1 | | 6/2013 |
| WO | WO 2014/094866 A1 | | 6/2014 |
| WO | WO 2016/078709 A1 | | 5/2016 |

* cited by examiner

*Primary Examiner* — Qin Zhu
(74) *Attorney, Agent, or Firm* — Birch, Stewart, Kolasch & Birch, LLP

(57) ABSTRACT

The present disclosure relates to a system and method for establishing a bond for allowing secure communication between a hearing aid and an external device. Especially, the system and method allows for establish the bond without one of the device present during the bonding process.

16 Claims, 3 Drawing Sheets

Phone    Tablet    PC

Left proxy connection    Right proxy connection

Dispenser    PC    Wireless Hearing Aid Programmer

PRE-PAIRING OF HEARING AIDS

FIELD

The present disclosure relates to a method of establishing a pairing between a hearing aid and one or more accessories, and to a fitting system for hearing aids for performing the method. More particularly, the disclosure relates to a method and system enabling an improved procedure for configuring wireless connection to/from hearing aids.

BACKGROUND

As hearing aids become more or more complex so does the configuration of them as well. This could include not only the audiological configuration, but also configurations relating to other parts of a hearing aid, such as the wireless connections. When the future user of a hearing aid is to receive a hearing aid, or hearing instrument, the future user usually visits a hearing heath care professional, not only for having his or her hearing tested so that the hearing aid can be best configured to provide an optimal hearing compensation directed to compensate for the specific hearing loss of the future user. If the future user already has an older hearing aid, the hearing capability still needs to be tested as hearing loss may change over time.

After the future user has selected a specific hearing aid style and brand, and the hearing loss has been properly mapped, the future user may also choose to have accessories connected to the hearing aid, or hearing aids depending on the user having a monaural or binaural setup. As described elsewhere, in a monaural setup the user is equipped with a single hearing aid at one ear, and in a binaural setup the user is equipped with a hearing aid at each ear. A binaural setup is often referred to as a binaural hearing aid. Further, even if the user has brought his or her devices, the specific hearing aid that the user is to receive may not be present. This could be due to may factors, such as need for delivery from a remote storage, need for individual customization of the hearing aid, e.g. molding of parts specifically to the individual user, e.g. for the user's ear canal.

As not all devices may be present at the time of the visit to the hearing healthcare professional, there is a need to provide a solution that addresses at least this problem. The present disclosure also provides at least an alternative to the prior art.

Wireless communication between two devices is preferably conducted via a secure, encrypted, communication link. In a protocol such as Bluetooth, pairing is performed to establish keys which subsequently can be used to encrypt the data sent via a secure link. A transport specific key distribution is performed to share the keys. The keys may then be used to encrypt a link in future reconnections, verify signed data, or perform random address resolution.

SUMMARY

The present disclosure provides in a first aspect a method of defining connection information between a hearing aid and an accessory, via a device configured to act as the hearing aid during a pairing process. The information obtained during the pairing process is to be stored in respective devices so that when the devices need to communicate, a secure connection between known devices may be established. The method may comprise providing a device configured to act as the hearing aid during a pairing process. As the hearing aid, or hearing aids, that the user is to receive may not be available during a fitting process, a device, e.g. a proxy device, is provided to take the role of the hearing aid or hearing aids during a pairing process. The method may further comprise providing the accessory to be paired with the hearing aid. An accessory may e.g. be a telephone of the user, a tablet device, a streaming device or a microphone device configured to be worn by another person or lay on a table so as to provide audio signals to the hearing aid or hearing aids, or any other type of device to be in wireless communication with the hearing aid or hearing aids. The method may further comprise initiating a pairing process between the device configured to act as the hearing aid and the accessory. This could be done e.g. via a fitting system at a hearing heath care professional or at any dispenser providing hearing aids to users. The method may further comprise storing specific bond data obtained from the pairing process for a secure connection between the hearing aid and the accessory in the device configured to act as the hearing aid. As the bond is established, bond data, i.e. encryption keys and the like, is stored in the device configured to act as hearing aid. After this data is stored, it may be sent to a factory or other location where this data is then to be stored in a specific hearing aid which is to be supplied to the user. This allows the user to receive the hearing aid without the hassle of having to pair the hearing aid with e.g. his or her phone, a process which may be cumbersome for some users. Both the device configured to act as the hearing aid during the pairing processor or the accessory may take the roles as the initiator or the responder in the pairing process.

Generally, the present disclosure aims to provide a method and system where an intermediate device, such as a stationary computer, a tablet computer, or the like device, is configured to take part of the task of defining a connection, such as defining the connection between a first device and at least a second device. This is advantageous when there is a need to define the conditions or parameters for a wireless connection between an accessory device, such as a stationary or portable auxiliary device, and a hearing aid or set of hearing aids, and this hearing aid or aids are not available at that particular point in time that the user visit the dispenser. The intermediate device is used temporarily, which means that the intermediate device acts as the hearing aid or set of hearing aids, for the purpose of conducting a pairing process. The information (or keys) obtained from the pairing is then stored and may be transferred to the hearing aid or set of hearing aids that are to be handed out to the person/patient.

The settings that are obtained during the process according to the present disclosure are thus related to the wireless connection between a hearing aid, or a set of hearing aids, and an external device. The external device not being a hearing aid but some other device that the hearing aid or set of hearing aids are to establish wireless connection to on a regular basis. Advantageously, this process is meant to alleviate the user at least for the burden of having to perform pairing between the hearing aid or set of hearing aids and an external device, such as a device configured to stream sound from e.g. a TV, or from the TV directly, or a device such as a device having a set of microphones, which is configured to stream sound based on input from the microphones to the hearing aid or set of hearing aids. This means that the hearing aid or aids function 'out of the box' when the user receives the specific hearing aids intended for him or her.

An intermediate device may be a device which may be configured to wirelessly receive signals comprising sound from other sources and then either directly forward or process the sound which is then wirelessly transferred to the hearing aid or set of hearing aids. For helping the user not having to perform the pairing him or herself, the proxy device, i.e. the intermediate device mentioned above, store the wireless connection information obtained during the pairing and this information may then be transferred to the actual hearing aid device at a later stage, e.g. during production or coding of the hearing aid or hearing aids.

The method according to the present disclosure may be performed during, or in connection with, a fitting procedure where a hearing health care processional define the audiological parameters for the hearing aid which are then stored in the hearing aid. However, the fitting procedure itself is only aimed at defining the audiological parameters for the processing of sound so that the user is at least partially compensated for his or her specific hearing loss.

The method may further comprise transmitting the specific bond data from the device configured to act as the hearing aid to a remote location and writing the specific bond data into a hearing aid. This transmission could be via a communication network, or via a physical medium. The transmitted data may then be processed and stored, e.g. downloaded, into the hearing aid that is to be supplied to the user.

The method may include that the pairing process follows the pairing process of a standard protocol. This could e.g. be the pairing process of Bluetooth or Bluetooth low energy, WIFI or any other suitable wireless protocol for hearing aids.

The method of defining connection information may be performed prior to, or after, a process of defining audiological settings for the hearing aid. The method of defining connection information may be performed separate from a process of defining audiological settings for the hearing aid. As the method of defining connection information is not as such associated with the process of defining audiological parameters, these two steps may be performed independently of each other. However, for reducing time consumption the two may be performed at the same visit of the user at a hearing health care professional, or in the same session while the user's hearing aid, or hearing aids, is being remotely fitted. When the user has a binaural hearing aid system, that is one hearing aid at each ear, the method according to the present disclosure may be performed for one hearing aid at the time, e.g. first a first hearing aid and then for a second hearing aid afterwards. A binaural hearing aid system may alternatively be assigned during one and the same pairing process.

The present disclosure further provides a device for configuring communication between a hearing aid and an accessory. Such a device could be a fitting system at a hearing health care professional, or another place where a hearing aid is to be fitted to a user, e.g. a self-fitting system where the user conducts a hearing test him- or herself. The device may be configured to act as a proxy for the accessory during a pairing process. This allow the pairing process to be performed without all devices being present at execution of the pairing process. The device may comprise a wireless interface configured to communicate with the accessory using a wireless protocol. The wireless interface may be part of the device or attached to the device. The device may further comprise a user interface wherein an operator is able to initiate a wireless pairing process between the device and the accessory while the accessory is in a pairing mode. This could be a graphical user interface and may include additional devices such as mouse and/or keyboard for inputting commands for the device. The device may be configured to exchange pairing information with the accessory and establish a bond between the device and the accessory. The exchange may be performed via the wireless interface. The device may be configured to store the bonding information.

The device may be configured to act as a monaural hearing aid or a binaural hearing aid during the pairing process. This allows storing data for each of the hearing aids in a binaural hearing aid setting.

The system as described herein allow for establishing a bond for secure communication between a hearing aid and an external device. Especially, the system and method allow for establish the bond without one (i.e. without all) of the device(s) being present during the bonding or pairing process.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
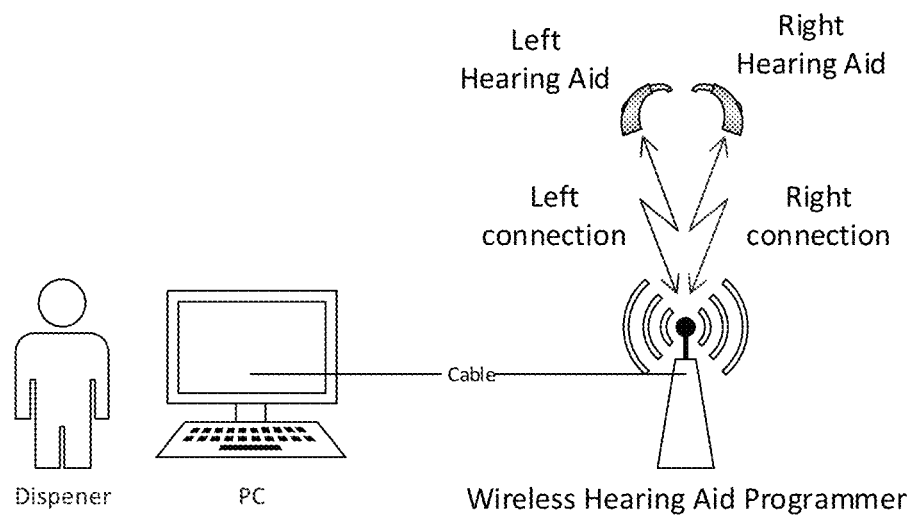
FIG. 1 schematically illustrates a system for fitting a hearing aid and a set of hearing aids, FIG. 2 schematically illustrates a pairing process performed using a wireless programming device, FIG. 3 schematically illustrate an advertising mode for a wireless programming device, FIG. 4 schematically illustrate wireless connection between a binaural hearing aid system and a number of accessory devices, and FIG. 5 schematically illustrate a range of device able to be used as programming device.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include wireless communication interface, microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid may be adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing aid" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid may be adapted to be worn in any known way. This may include i) arranging a unit of the hearing aid behind the ear with a tube leading air-borne acoustic signals into the ear canal or with a receiver/loudspeaker arranged close to or in the ear canal such as in a Behind-the-Ear type hearing aid, and/or ii) arranging the hearing aid entirely or partly in the pinna and/or in the ear canal of the user such as in a In-the-Ear type hearing aid or In-the-Canal/Completely-in-Canal type hearing aid, or iii) arranging a unit of the hearing aid attached to a fixture implanted into the skull bone such as in Bone Anchored Hearing Aid or Cochlear Implant, or iv) arranging a unit of the hearing aid as an entirely or partly implanted unit such as in Bone Anchored Hearing Aid or Cochlear Implant.

A "hearing system" refers to a system comprising one or two hearing aids, and a "binaural hearing system" refers to a system comprising two hearing aids where the devices are adapted to cooperatively provide audible signals to both of the user's ears. The hearing system or binaural hearing system may further include auxiliary device(s) that communicates with at least one hearing aid, the auxiliary device affecting the operation of the hearing aids and/or benefitting from the functioning of the hearing aids. A wired or wireless communication link between the at least one hearing aid and the auxiliary device is established that allows for exchanging information (e.g. control and status signals, possibly audio signals) between the at least one hearing aid and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid. The remote control is adapted to control functionality and operation of the at least one hearing aids. The function of the remote control may be implemented in a SmartPhone or other electronic device, the SmartPhone/electronic device possibly running an application that controls functionality of the at least one hearing aid.

In general, a hearing aid includes i) an input unit such as a microphone for receiving an acoustic signal from a user's surroundings and providing a corresponding input audio signal, and/or ii) a receiving unit for electronically receiving an input audio signal. The hearing aid further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing aids, the output unit may include one or more output electrodes for providing the electric signals such as in a Cochlear Implant.

FIG. 1 schematically illustrates a system where a computing device, here shown as either a tablet computer or a stationary computer, each with a graphical user interface allowing an operator to define settings for the hearing aid. Most often this is performed using a specialized program, referred to as a fitting program, with which the operator performs, or the program automatically conducts, a series of audiological tests which in the end results in one or more programs defined and designed for the user of the hearing aid. The hearing aid is then able to process audio from the user's surroundings to compensate for the user's specific hearing loss.

In addition to the audiological setup of the hearing aid, wireless connection or connections between the hearing aid or hearing aids to one or more external devices may be configured. Examples of such external devices include microphone devices to be worn by other people that the hearing aid user is to talk to, such as a partner, mobile phone or mobile phones owned by the user, tablet computer or computers owned by the user.

Figure 2:
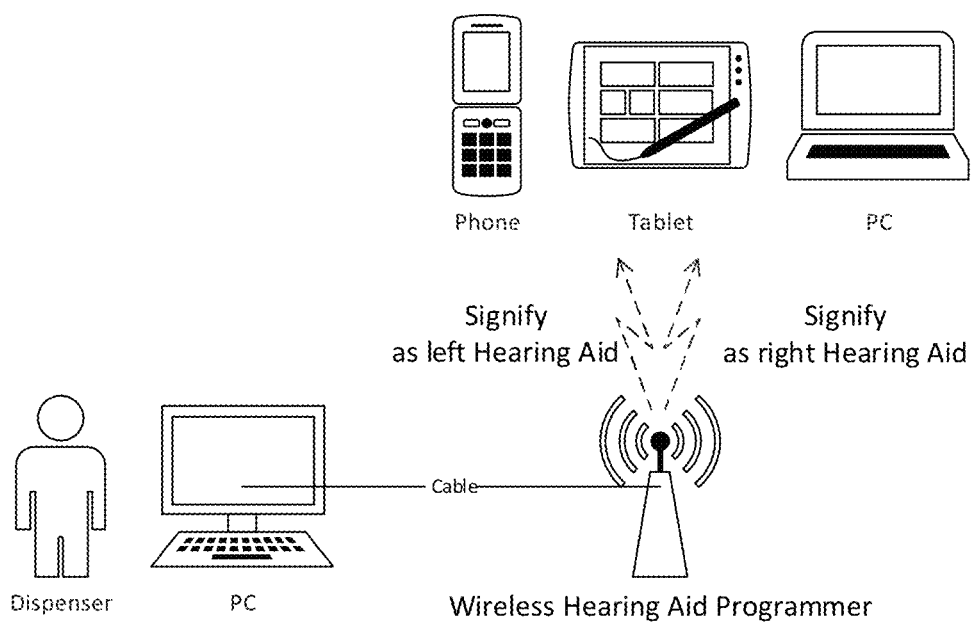

FIG. 2 illustrates a computer device, here a PC, operated by an operator, who could be a hearing health care professional, a hearing aid dispenser or the like, conducting fitting of a hearing aid. The fitting may be conducted using at least partly automated software.

As the actual hearing aid, or hearing aids, that the user will receive is usually not available during the fitting process, the hearing aid user will be forced to perform suitable wireless interface configurations at home after receiving the hearing aids. This may be cumbersome to some users, and the present disclosure provides a method of defining connection information between a hearing aid and an accessory. The accessory is in this context one of the external devices that the user needs to connect the hearing aid or hearing aids to.

The method according to the present disclosure and illustrated in view of the setup in FIG. 2, comprises providing a device configured to act as the hearing aid during a pairing process, here the wireless hearing aid programmer. This device can be provided at a hearing care professional, or in the control of a person responsible for the process of fitting hearing aids. The method further comprises providing the accessory to be paired with the hearing aid, here illustrated by the three devices phone, tablet and PC. After bringing the device and the accessory in range to be wirelessly connected, the operator then initiates a pairing process between the device configured to act as the hearing aid and the accessory. This can, as stated, be done locally, or it could be performed as part of a remote fitting process, where the person responsible is not in the same room as the future user, but the fitting process is conducted via a communication network, such as the Internet. The process may be initiated with one or more devices, e.g. in sequential order, with each pairing process being finished before the next one start. After having performed the steps above, the method provides for storing specific bond data for a secure connection between the hearing aid and the accessory in the device configured to act as the hearing aid. With this information it is possible to load or store the data in a hearing aid, that at this point in time might not be built yet.

As the location where the fitting and pre-bonding is performed is not the same location where the hearing aid will be built/assembled, the present disclosure provides for transmitting the specific bond data from the device configured to act as the hearing aid to a remote location and writing the specific bond data into a hearing aid. This could include a transmission via the interne or via a physical data storage medium, or any other suitable method or carrier.

Throughout the present disclosure, reference may be made to a hearing aid, however, it is to be understood that a hearing aid may also include a binaural hearing aid, i.e. a system where the user is provided with a hearing aid at each ear.

The wireless hearing aid programmer may act as a proxy device during the pairing process as a left and right hearing aid, either simultaneously or one after the other.

The method according to the present disclosure also allows for the pairing process to follow the pairing process of a standard protocol. Such protocol could be a Bluetooth protocol, Bluetooth low energy, or other suitable short range communication protocols. The Bluetooth protocol could for instance be Bluetooth 4.0, or above.

Figure 3:
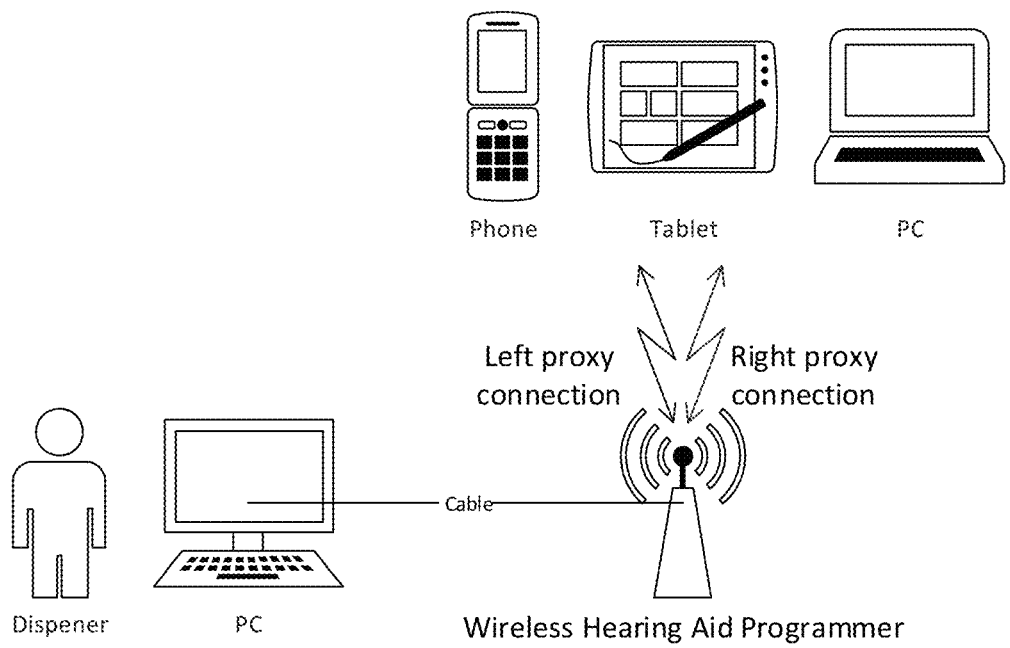

FIG. 3 schematically illustrates a wireless hearing aid programmer, in the present disclosure also referred to as the device configured to act as the hearing aid during a pairing process, which is operated by a dispenser via a PC. As described elsewhere the PC executes a special program for performing fitting of the hearing aid. The wireless hearing aid programmer signifies, or transmits advertising packages if the protocol is Bluetooth Low Energy, as either or both the left and/or right hearing aid to which ever device is going to be paired with either a monaural or binaural hearing aid.

Figure 4:
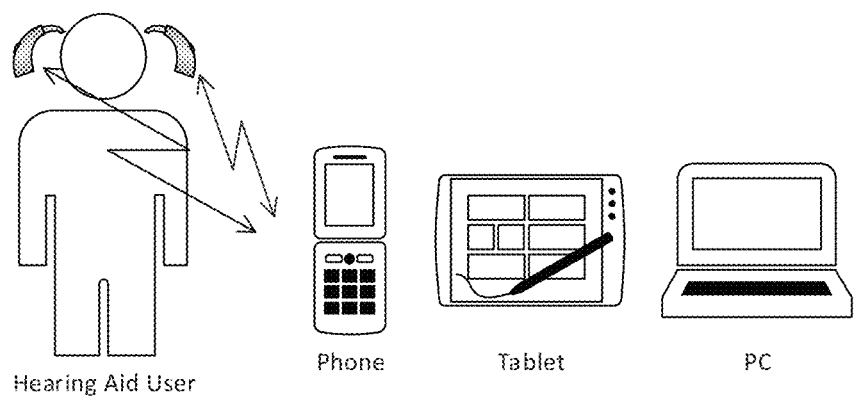

FIG. 4 schematically illustrate a user wearing a binaural hearing aid system, where the hearing aids have received bonding data allowing them to connect wirelessly to a phone, tablet and/or a computer owned by the user without the need for the user him or herself to conduct the pairing process. The binaural hearing aid system works directly out of the box so to say.

Figure 5:
Figure 5:
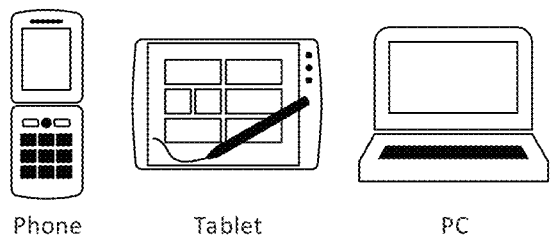

FIG. 5 schematically illustrates three different devices that can act as wireless hearing aid programmer, and/or that the wireless hearing aid programmer can connect to. The wireless hearing aid programmer may be software executed on a device, and a wireless device being part of that device may then be used as wireless interface during fitting and/or pairing as described herein.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A method of defining connection information between a hearing aid and an accessory using a device configured to act as the hearing aid, the method comprising:
   providing the device configured to act as the hearing aid during a pairing process,
   providing the accessory to be paired with the hearing aid,
   initiating a pairing process between the device configured to act as the hearing aid and the accessory,
   storing specific bond data from the pairing process for a secure connection between the hearing aid and the accessory in the device configured to act as the hearing aid, wherein
   the method further comprises transmitting the specific bond data from the device configured to act as the hearing aid to a remote location for writing the specific bond data into a hearing aid.

2. The method according to claim 1, further comprising writing the specific bond data into a hearing aid.

3. The method according to claim 1, wherein the pairing process follows the pairing process of a standard protocol.

4. The method of claim 3, wherein the standard protocol is Bluetooth.

5. The method of claim 1, wherein the method of defining connection information is performed separate from a process of defining audiological settings for the hearing aid.

6. The method of claim 1, wherein the method of defining connection information is performed prior to, or after, a process of defining audiological settings for the hearing aid.

7. The method of claim 1, wherein the hearing aid is a binaural hearing aid system comprising a first and a second hearing aid and the method comprises performing defining connection information for the first hearing aid in a first step and performing defining connection information for the second hearing aid in a second step.

8. A device for configuring communication between a hearing aid and an accessory, the device is configured to act as a proxy for the accessory during a pairing process, the device comprising a wireless interface configured to communicate with the accessory using a wireless protocol, the device further comprising a user interface wherein an operator is able to initiate a wireless pairing process between the device and the accessory while the accessory is in a pairing mode, the device being configured to exchange pairing information with the accessory and establish a bond between the device and the accessory, the device configured to store the bonding information, wherein the device is further configured to transmit the bonding information to a remote location for writing the bonding information into a hearing aid.

9. The device according to claim 8, wherein the device is configured to act as a monaural hearing aid or a binaural hearing aid during the pairing process.

10. A method of defining connection information for wireless communication between a hearing aid and a user's accessory using a device configured to act as the hearing aid, the method comprising:

providing the device configured to act as the hearing aid during a pairing process, providing the user's accessory to be paired with the hearing aid, initiating a wireless pairing process between the device configured to act as the hearing aid and the user's accessory, storing specific bond data from the pairing process for a secure wireless connection between the hearing aid and the user's accessory in the device configured to act as the hearing aid, and transmitting the specific bond data from the device configured to act as the hearing aid to a remote location for writing the specific bond data into a hearing aid.

11. The method according to claim 10, further comprising writing the specific bond data into a hearing aid.

12. The method according to claim 10, wherein the pairing process follows the pairing process of a standard protocol.

13. The method of claim 12, wherein the standard protocol is Bluetooth.

14. The method of claim 10, wherein the method of defining connection information is performed separate from a process of defining audiological settings for the hearing aid.

15. The method of claim 10, wherein the method of defining connection information is performed prior to, or after, a process of defining audiological settings for the hearing aid.

16. The method of claim 10, wherein the hearing aid is a binaural hearing aid system comprising a first and a second hearing aid and the method comprises performing defining connection information for the first hearing aid in a first step and performing defining connection information for the second hearing aid in a second step.

* * * * *